Patented Aug. 14, 1951

2,564,291

UNITED STATES PATENT OFFICE 2,564,291

HOMOPOLYMERIZATION OF VINYL CHLORIDE IN AQUEOUS MEDIUM WITH PHENOL-ALDEHYDE CONDENSATION PRODUCT AS EMULSIFYING AGENT

Robert J. Wolf, Lakewood, Ohio, assignor to The B. F. Goodrich Company, New York, N. Y., a corporation of New York No Drawing. Application July 3, 1948,
Serial No. 37,047

3 Claims. (Cl. 260—43)

This invention relates to the polymerization in aqueous medium of unsaturated compounds containing the $CH_2=C<$ group, that is, monomeric vinylidene compounds, either alone, in admixture with one another or with other unsaturated materials, and pertains particularly to the use in such polymerization of an emulsifying or dispersing agent comprising a water-soluble phenol-aldehyde condensation product. The invention more specifically relates to the polymerization in aqueous medium, in the presence of such an emulsifying or dispersing agent, of a chloroethylene containing from 1 to 2 chlorine atoms on one only of the carbon atoms, that is, vinyl or vinylidene chloride, or mixtures thereof with one another or with other monoolefinic vinylidene compounds such as acrylonitrile, vinyl acetate, methyl acrylate, ethyl acrylate, methyl methacrylate, or the like.

It is well known that vinylidene compounds can be polymerized in aqueous emulsion or dispersion in the presence of various electrolytic emulsifying agents among which are the fatty acid soaps and the synthetic saponaceous materials such as the hymolal sulfates and alkaryl sulfonates, and in the additional presence of catalysts, buffers, modifiers and the like, to form polymers predominantly linear in character, and obtained either as stable dispersions or latices or as fine granular solids. It is known, for example, that vinyl chloride can be polymerized in aqueous emulsion in the presence of a small quantity of potassium persulfate catalyst and a small quantity of sodium lauryl sulfate as an emulsifier to produce a yield of polyvinyl chloride of about 85% in 20 to 40 hours at 60° C. The polymers so produced, however, contain small amounts of electrolytic materials, consisting primarily of emulsifier residues, and as a result are often milky and translucent in appearance, permeable to moisture, and deficient in heat and light stability and in electrical properties.

I have now discovered that vinylidene compounds generally, and preferably monomeric materials comprising vinyl chloride or vinylidene chloride may be efficiently polymerized in an aqueous medium in the presence of a water-soluble phenol-aldehyde resinous condensation product, which serves as an emulsifying or dispersing agent, and in the additional presence of a small amount of a peroxygen compound as a catalyst, to obtain high yields of polymers having superior and unusual properties. By the use of phenol-aldehyde resins as emulsifying agents, there are obtained polymers having exceedingly high impermeability to moisture, greatly improved clarity and superior resistance to light and heat. Moreover, the polymers obtained are as easily processed as those made with conventional emulsifying agents yet may be rendered harder and less thermoplastic in service by reason of the further condensation during processing of the phenol-aldehyde resin present therein.

The phenol-aldehyde resinous condensation products which are useful in the method of this invention as emulsifying or dispersing agents are those which are completely soluble in water. Such condensation products known to the art under various trade names including "Durez 12369" and "Amberlite PR–14" are believed to be formed, for example, by reaction of about two parts of formaldehyde or other aldehyde with about one part of a phenol in the presence of a catalyst consisting of from 15 to 30 grams of fixed caustic for each 1,000 grams of phenol, with the time of reaction and catalyst concentration being properly balanced to prevent the reaction going too far. Lactic or phthalic acid is added at the end of the reaction to neutralize the catalyst and prevent further reaction. Water-soluble phenol-aldehyde resins may also be made using acid catalysts. These water-soluble resins are light in color and wholly water-soluble. They are sometimes called "hydrophilic" resins in contrast with the water-insoluble phenolic resins which are known as "hydrophobic" resins. The method of preparation of these resins is well understood in the art and their method of preparation forms no part of this invention.

The term "phenol" as used in the expression "phenol-aldehyde resin" is used in the generic sense to include any of the nuclear hydroxy-substituted aromatic hydrocarbons containing only carbon, hydrogen and oxygen including phenol itself, cresol, xylenol and others and also the mixture of phenols known to the trade as "cresylic acid." The term "aldehyde" is also used in the generic sence to include any active aldehyde consisting solely of carbon, hydrogen and oxygen which forms a condensation product with a phenol. Aldehydes which have been found particularly effective are formaldehyde, acetaldehyde, propionaldehyde, butyraldehyde, furfuryl-aldehyde and others.

The amount of water-soluble phenol-aldehyde resin used as an emulsifying agent in the polymerization method of this invention may be varied widely depending upon the properties desired in the polymer produced. For example, as little as 0.5 to 3.0 parts (based on 100 parts of monomeric material) of a water-soluble phenol-formaldehyde resin will efficiently emulsify a mixture of vinyl chloride and water and produce a fine granular polyvinyl chloride having excellent properties. Higher amounts, such as 3 to 10 or more parts may also be used with no observed inhibitory effect on the rate of polymerization and with the production of exceedingly fine granular resins which are admirably adapted for use in the preparation of resin pastes and solutions because they are readily dispersible or soluble in plasticizers and solvents and produce resin films of striking clarity and having unusual properties of tensile strength and resistance to sag (lowered thermoplasticity). Still higher amounts of water-soluble phenolic resin may be used to produce polymers which are sufficiently thermoplastic to be molded and which on heating are transformed into products of increased hardness and stiffness by reason of the further condensation of the phenolic resin.

When using the phenol-aldehyde emulsifying agent of this invention, the polymerization temperature is not critical and may vary widely from as low as 0 or 10° C. or lower to as high as 100° C. or higher, though generally, polymerization of the preferred monomeric materials according to this invention is effected at 20 to 60° C. with a great improvement in the physical properties of the resultant polymer.

The amount and kind of polymerization catalyst for use in conjunction with the phenol-aldehyde emulsifying agent of this invention is likewise not critical. As little as 0.05 to 0.1% to as high as 0.5% or 1% or even as high as 5% (based on the monomers) of any peroxygen compound may be used as catalyst, but, generally, the use, as catalyst, of 0.2 to 0.7% of an oil-soluble peroxygen or oxygen-liberating compound such as o,o-dichlorobenzoyl peroxide, dicaproyl peroxide and dibenzoyl peroxide is preferred. However, water-soluble peroxygen compounds may also be used among which are hydrogen peroxide, sodium, potassium or ammonium persulfate, alkali metal perborates such as sodium perborate, the percarbonates such as sodium percarbonate, the perphosphates such as sodium perphosphate and the like.

The polymerization is preferably carried out in the absence of gaseous or molecular oxygen for it has been observed that the presence of small amounts of molecular oxygen will cause an appreciable "induction period" or lag in the commence of polymerization, though ultimately the reaction proceeds to completion. Accordingly, it is preferred that the polymerization vessel be evacuated or supplied with an inert atmosphere such as nitrogen before charging the monomeric materials. Polymerization in the presence of the phenol-aldehyde emulsifying agents is preferably effected in an aqueous medium in which the amount of water present is from 1 to 5 times that of the monomeric material. It is also preferable that the polymerization mixture be mildly agitated during polymerization.

The phenol-aldehyde emulsifying or dispersing agent of this invention may be employed in conjunction with various other polymerization expedients. For example, in polymerizations involving vinyl chloride, vinylidene chloride and the like, buffer salts such as sodium bicarbonate, sodium meta silicate, or lead acetate may be added to the reaction mixture. Stabilizing agents for the finished polymer such as, for example, lead silicate and the like, may also be incorporated into the reaction mixture.

The method of this invention is applicable generally to the polymerization of unsaturated compounds containing the $CH_2=C<$ group, that is, vinylidene compounds or compounds containing a terminal methylene group attached by a double bond to a carbon atom. Examples of such compounds include vinylidene compounds containing only one carbon to carbon unsaturated bond such as vinyl chloride, vinylidene chloride, styrene, p-chlorostyrene, 3,5-dichlorostyrene, p-methoxy styrene, acrylonitrile, methacrylonitrile, alpha-chloro acrylonitrile, methyl acrylate, ethyl acrylate, methyl methacrylate, butyl ethacrylate, methacrylamide, vinyl methyl ketone, vinyl pyridine, vinyl carbazole, vinyl methyl ether, vinyl acetate, vinyl benzoate, isobutylene, ethylene, and other similar monoolefinic polymerizable compounds. Other vinylidene compounds containing more than one unsaturated linkage which may be polymerized in the presence of the water-soluble phenol-aldehyde emulsifying agents include the conjugated dienes such as butadiene-1,3, isoprene, and other butadiene-1,3 hydrocarbons, chloroprene and 3-cyano butadiene-1,3, as well as trienes such as myrcene and compounds containing olefinic and acetylenic unsaturated carbon to carbon bonds such as vinyl acetylene, vinyl ethynyl diethyl carbinol and the like. The above vinylidene compounds may be copolymerized with one another or with still other unsaturated polymerizable materials such as diethyl maleate, diethyl fumarate, maleic acid or anhydride and others.

It will be understood from the above examples that vinyl compounds are a sub-genus of vinylidene compounds since they contain the characteristic $CH_2=C<$ structure, one of the valences being connected to hydrogen to form the (vinyl)

group.

The phenol-aldehyde emulsifying agent of this invention is particularly applicable to the polymerization of the chloroethylenes which contain from one to two chlorine atoms on one only of the carbon atoms and which have only hydrogen atoms on the remaining valences of the carbon atoms, that is, vinyl chloride and vinylidene chloride, mixtures of these materials and mixtures of one or both of these materials with other monomeric materials such as methyl acrylate, ethyl acrylate, methyl methacrylate, ethyl alpha-chloro acrylate, acrylonitrile, methacrylonitrile, vinyl acetate, vinyl propionate, vinyl butyrate, vinyl bromide, vinyl fluoride, vinylidine bromide, vinylidene chloro fluoride, and others. The best results are obtained with monomeric materials the predominant constituent of which is a chloroethylene.

The invention will be described with reference to the following specific examples which are intended to be merely illustrative of the invention and not a limitation thereon.

*Example 1*

The phenol-aldehyde emulsifying agent is utilized to great advantage in the polymerization of vinyl chloride in order to obtain clear plastic stocks from the plasticized polymer. According to this example, an emulsion is prepared containing the following materials and is charged into a stainless steel polymerization vessel fitted with a paddle type agitator:

| | Parts |
|---|---|
| Vinyl chloride | 100 |
| Water | 200 |
| Water-soluble phenol-formaldehyde resin ("Durez 12369") | 0.5 |
| Lead acetate | 0.5 |
| Dicaproyl peroxide | 0.3 |

The above emulsion is heated to 50° C. and held at that temperature with agitation until the completion of the polymerization reaction. After 25 hours, a yield of 90 to 95% (on vinyl chloride) of polymer in the form of coarse granules is obtained. The phenol-formaldehyde emulsifying agent is found to be exceedingly efficient as an emulsifier because no polymer buildup is observed on the reactor walls.

The polymer obtained in Example 1 had a specific viscosity of 0.49 indicating that the polymer was of high molecular weight. Specific viscosity is the ratio of the times of efflux from an Ostwald pipette at 30° C. for a 20% solution of the resin in nitrobenzene and pure nitrobenzene. The polymer of the above example formed a band on a roll mill at a lower temperature and with less plasticizer than is required for conventional high molecular weight polyvinyl chloride yet when the polymer was cooled it was considerably harder than the conventional polymer.

Moreover, the polymer of the preceding example revealed a surprising stability to light and heat. The stability to heat of polyvinyl chloride may be determined by measuring the amount of hydrochloric acid generated when a quantity of the resin is heated in a current of nitrogen gas at 175° C. The gases are led into a measured quantity of 0.1 N. sodium hydroxide containing phenolphthalein and the time measured for the color change. Fresh portions of caustic solution are added and time measurements for each color change made until a plot of time versus hydrochloric acid generation can be made. The polymer of Example 1 showed no appreciable breakdown in 30 minutes (such time will be designated BI hereafter) and generated only 25 mg. of hydrochloric acid in the first hour (BN value). The rate of breakdown (BR read from the slope of the curve was only 21.4 mg. of hydrochloric acid/1,000 gms. of polymer/minute. By comparison polyvinyl chloride made by more conventional emulsion polymerization in the presence of gelatin as a protective colloid and lead acetate as a stabilizer shows a breakdown rate (BR) of 40 mg. of hydrochloric acid/1,000 gms. of polymer/minute and a total of 116 mg. of hydrochloric acid/1,000 gms. of polymer in the first hour (BN value) of heating at 175° C. It is thus seen that polyvinyl chloride made by the method of this invention is much more stable to heat than polymers produced by the methods of the prior art.

*Example 2*

The following mixture of materials was prepared and subjected to polymerization at 50° C. in a stainless steel reaction vessel:

| | Parts |
|---|---|
| Vinyl chloride | 100 |
| Water | 200 |
| Water-soluble phenol-formaldehyde resin ("Amberlite PR-14") | 3.0 |
| Dicaproyl peroxide | 0.6 |
| Lead acetate | 0.5 |

Polymerization was complete in 40 hours and a yield of 95% obtained. Again no polymer buildup on the reactor walls was observed. The polymer was tested for heat stability and was found to have a BI value of 40 minutes, a BR value of 19 mg. hydrochloric acid/1,000 gms. of polymer/minute, and a BN value of only 44 mg. hydrochloric acid/1,000 gms. of polymer for the first hour.

The polymer of Example 2 was tested in still another manner to determine its stability to heat as compared to polyvinyl chloride prepared by conventional emulsion polymerization in the presence of saponaceous emulsifying agents by preparing 10% solutions in dibutyl phthalate of the polymer of Example 2 and of the standard polyvinyl chloride. The solutions are prepared by placing 3 grams of each polymer in 38 x 200 mm. test tubes containing 25 ml. of water-white dibutyl phthalate. The tubes are placed in a 55° C. oven for 16 hours to insure solution. The test tubes containing the solutions are placed in an oil bath maintained at 175° C. for exactly 15 minutes. At 175° C. the gelatinous solutions become fluid. Each solution should be stirred at least twice during the 15 minute heating period. After 15 minutes heating the tubes are emptied into Fisher cells. The degree of coloration as revealed by the transmissibility of each resin sample was determined on a Fisher Electrophotometer using a 425 B filter. The instrument should be standardized with a fresh sample of the water white dibutyl phthalate used in preparing the solutions. The reading in % transmission is assigned to each polymer sample as an indication of its stability toward light. The solution of the polymer of Example 2 transmitted 84% of the light. The standard polyvinyl chloride transmitted only 60.7% of the light. Thus, it is seen that polyvinyl chloride made by the method of this invention is possessed of greatly superior resistance to the effects of heat.

The polymer of Example 2 formed a smooth plasticized resin sheet which was clearer and had less "fisheyes" (unplasticized particles of resin) than a sample of polyvinyl chloride made in the presence of conventional saponaceous emulsifying agents. Polyvinyl chloride made in the presence of the usual emulsifying agents is slightly translucent due to the difficulty of completely removing the emulsifier from the polymer. The phenol-aldehyde emulsifiers of this invention produce clear solutions which after heating may be further condensed to form resins which are clear and transparent. For this reason their presence in a polymer does not impair the clarity of a film made therefrom.

*Example 3*

The following mixture of materials, in which parts are by weight, was prepared and subjected to polymerization at 50° C.:

| | Parts |
|---|---|
| Vinyl chloride | 100 |
| Water | 200 |
| Water-soluble phenol-formaldehyde resin of Example 2 | 6.0 |
| Dicaproyl peroxide | 0.6 |

The reaction was complete in 25 hours and produced a yield of polymer of 95% based on the vinyl chloride. No polymer buildup on the walls of the reaction vessel was observed after the reaction, indicating that the monomeric materials were efficiently emulsified. The polymer was obtained in the form of an extremely fine solid which was especially suited for use in the preparation of fabric coating pastes. Using the usual amounts of di-2-ethylhexyl phthalate plasticizer (50 to 60% based on the polymer) in order to obtain a fluid paste a film laid down from such a paste is more firm and less sticky than pastes prepared from conventional polyvinyl chlorides and having the same plasticizer content. The polymer made by the method of Example 3 is also superior in resistance to heat and light than are conventional emulsion-prepared vinyl chloride polymers.

It is to be noted that monomeric materials which normally polymerize to produce thermoplastic resinous materials may be polymerized by the method of this invention to produce polymers having increased resistance to heat and light, superior clarity, improved physical properties of tensile strength, hardness, and elongation and reduced thermoplasticity. The foregoing specific examples clearly show that the water-soluble phenol-aldehyde resin is an exceedingly efficient emulsifying agent because no polymer deposits on the walls of the polymerization vessel was observed in any of the polymerizations and the polymer was obtained in the form of fine particles. Thus, it is seen that the water-soluble phenol-aldehyde condensation products are superior to the saponaceous emulsifying agents both in their ease of use and in the products obtained as a result of their use.

While there has been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

I claim:
1. The method which comprises preparing a reaction medium consisting of vinyl chloride and an aqueous phase consisting solely of water, a peroxygen compound, and from 0.5 to 10% by weight based on the vinyl chloride of a water-soluble phenol-aldehyde condensation product, and agitating said medium to polymerize said vinyl chloride.

2. The method which comprises preparing a reaction medium consisting of vinyl chloride and an aqueous phase consisting solely of water, dicaproyl peroxide, and from 0.5 to 10% by weight based on the vinyl chloride of a water-soluble phenol-formaldehyde condensation product, and agitating said medium to polymerize said vinyl chloride.

3. The method which comprises preparing a reaction medium consisting of vinyl chloride and an aqueous phase consisting solely of water, dicaproyl peroxide, lead acetate, and from 0.5 to 10% by weight based on the vinyl chloride of a water-soluble phenol-formaldehyde condensation product, and agitating said medium to polymerize said vinyl chloride.

ROBERT J. WOLF.

REFERENCES CITED

The following references are of record in the file of this patent:

UNITED STATES PATENTS

| Number | Name | Date |
| --- | --- | --- |
| 2,279,436 | Berg | Apr. 14, 1942 |
| 2,404,791 | Coffman | July 30, 1946 |